United States Patent Office 3,114,727
Patented Dec. 17, 1963

3,114,727
RESIN COMPOSITION AND PROCESS FOR
PREPARING THE SAME
William L. Hensley, Stamford, Conn., assignor to American Cyanamid Company, New York, N.Y., a corporation of Maine
No Drawing. Filed Oct. 3, 1960, Ser. No. 59,786
4 Claims. (Cl. 260—45.2)

This invention relates to novel compositions of matter comprising a blend of (1) from about 72% to 93% by weight of a resinous reaction product of a polyhydric phenol and epichlorohydrin and (2) correspondingly from about 28% to about 7% by weight of hexamethyl ether of hexamethylol melamine, said percentages being based on the total weight of resin solids and hexamethyl ether of hexamethylol melamine, dissolved in an inert organic solvent and containing para-toluene sulfonic acid as a catalyst. Still further, this invention relates to coating compositions comprising epoxy resinous materials of the class described with hexamethyl ether of hexamethylol melamine dissolved in an inert organic solvent and containing from about ½% to 1½% by weight of para-toluene sulfonic acid based on the weight of the melamine compound.

One of the objects of the present invention is to produce a novel composition of matter comprising an epoxy resinous material produced by reacting a polyhydric phenol and epichlorohydrin in physical admixture with the stated amounts of the hexamethyl ether of hexamethylol melamine, dissolved in an inert organic solvent and containing catalytic amounts of para-toluene sulfonic acid. A further object of the present invention is to produce a coating composition which when applied to a substrata and cured will produce films having substantially improved gloss, improved color, improved solvent resistance, improved chemical resistance and particularly improved color stability especially when subjected to baking and overbaking. These and other objects of the present invention will be discussed in greater detail hereinbelow.

The compositions of the present invention are made up of four principal components, namely, (1) an epoxy resinous material, (2) hexamethyl ether of hexamethylol melamine, (3) an inert organic solvent, and (4) paratoluene sulfonic acid. The epoxy resinous materials used in the present invention may be prepared by reacting a polyhydric phenol with epichlorohydrin. Among the polyhydric phenols which may be used in the preparation of the epoxy resins used in the present invention are resorcinol, hydroquinone and substituted hydroquinones such as p-tertiarybutyl hydroquinone, 4,4'-dihydroxydiphenyldimethyl methane, 4,4'-dihydroxydiphenylethylmethyl methane, 4,4'-dihydroxydiphenyldiethyl methane, 4,4'-dihydroxydiphenylmethylpropyl methane, 4,4'-dihydroxydiphenylethylphenyl methane, 4,4'-dihydroxydiphenylpropylphenyl methane, 4,4'-dihydroxydiphenylbutylphenyl methane, 4,4'-dihydroxydiphenylditolyl methane, 4,4'-dihydroxydiphenyltolylmethyl methane, and the like. These diphenols may be defined more generically by the following general formula:

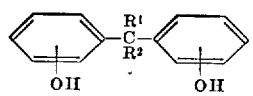

in which the phenolic hydroxyl groups may be in the 2,2'; 2,3'; 2,4'; 3,3'; 3,4'; and 4,4' positions on the aromatic rings and in which $R^1$ and $R^2$ separately may be hydrogen, methyl, ethyl, propyl, isopropyl, butyl, isobutyl, pentyl, isopentyl, hexyl, isohexyl, cyclohexyl and substituted cyclohexyl groups including the methyl, ethyl, propyl, butyl, pentyl, and hexyl substituted cyclohexyls, and the like or aromatic groups such as phenyl, tolyl, xylyl and the like. The total number of carbon atoms in the $R^1$ and $R^2$ positions should not exceed 14. Additionally, on the aromatic rings there may be other substituents in addition to the hydroxyl groups such as alkyl groups containing from 1 to 4 carbon atoms, namely, methyl, ethyl, propyl, isopropyl, butyl, isobutyl and tertiary butyl and halo groups such as chloro, bromo, iodo and fluoro. Additionally, one may make use of the indanols disclosed in the U.S. Patent 2,754,285.

Epichlorohydrin is used as the reactant for the dihydric phenols but compounds such as epibromohydrin, epiiodohydrin and epifluorohydrin may be used. These epoxy resins are well known in the art and are available commercially. The method of preparation of the resins is also well known and has been published many times especially in patent literature. In the preparation of these epoxy resins the epichlorohydrin is generally used in excess of the stoichiometric quantities required to react with the diphenol so as to provide free hydroxyl groups in the resin molecule. Ordinarily, the reaction is carried out in the presence of an alkaline material which is used to absorb the halogen released in the course of reaction.

In the preparation of the hexamethyl ether of hexamethylol melamine, melamine and formaldehyde are reacted together in a mol ratio of at least 1:6.5 melamine to formaldehyde respectively. One may use as much as 1:20 mols of melamine to formaldehyde respectively. In order to produce the hexamethyl ether of the hexamethylol melamine, the latter compound is reacted in the presence of from about 10 to 16 mols of methanol. The preparation of the hexamethylol melamine and the hexamethyl ether thereof is set forth in British Plastics, February 1943, Gams, Widmer and Fisch, pages 508–520. The methods outlined therein may be adopted or improved methods of preparing these materials may be utilized. For instance the processes outlined in U.S. 2,918,452 may be used.

In preparing the compositions of the present invention, it is desirable to make use of an inert organic solvent. These solvents may be aromatic hydrocarbon solvents such as benzene, toluene, xylene and the like, or solvents containing alcoholic hydroxy groups such as ethyl ether of ethylene glycol, butyl ether of ethylene glycol, ethyl ether of diethylene glycol, butyl ether of diethylene glycol or the acetates thereof such as the acetate of ethyl ether of ethylene glycol, the acetate of the butyl ether of ethylene glycol, the acetate of the butyl ether of diethylene glycol, or other acetates such as ethyl acetate and n-butyl acetate or the aliphatic monohydric alcohols such as methanol, ethanol, propanol, butanol, amyl alcohol and the like. Still further one may make use of the polyhydric alcohols such as ethylene glycol, propylene glycol, butylene glycol, diethylene glycol, dipropylene glycol or the alkane diols such as butanediol-1,4; butanediol-1,3; pentanediol-1,5; hexanediol-1,6 and the like. Additionally, one may use as a solvent the ketones such as acetone, methyl ethyl ketone, diethyl ketone, methyl isobutyl ketone, cyclohexanone and the like. Quite obviously, mixtures of these solvent may be utilized and in some instances are recommended. The amount of solvent which is used may be varied over a very substantial range depending on the viscosity of the composition desired. For instance, if the composition is to be applied as a coating composition by use of a doctor knife, very viscous materials may be used which are almost paste like, in which event, relatively small amounts of solvent are needed whereas if one wished to prepare a coating composition for application by brush or roller, larger amounts of solvent should be used. Still further, if the coating composition is to be applied by means of spray, even greater amounts of solvent may be used. For some applications such as hot melt or fluidized bed applications no solvent of any kind is required. It depends then upon the mode of application of the composition as to the amount of solvent used. Consequently the solvent content can be varied from 0% to 95% by weight based on the total weight of vehicle solids and solvent.

If the coating compositions of the present invention are to be used as a clear varnish, no pigment or coloring need be used. However, if it is desired to combine these compositions into colored coating compositions a wide variety of pigments and dyes may be incorporated therein in conventional amounts in order to produce the desired effect.

Epoxy resinous materials of the class used in the compositions of the present invention have been blended with aminoplast resins including melamine resins such as the alkylated and the unalkylated melamine resins. In such blends, compatibility problems have frequently been encountered and it is not known what is the cause of this limited incompatibility. In the use of these compositions of the prior art, it has been suggested that an alkaline catalyst be used inasmuch as most epoxy resins require an alkaline catalyst in order to achieve cure of the composition. Acidic catalysts have been tried in a number of different specific tests but without appreciable success. A substantial plurality of acidic catalysts have been established to be inoperative. One of the critical features of the present invention, however, resides in the use of catalytic quantities of a specific acid catalyst, namely, para-toluene sulfonic acid. The amount of para-toluene sulfonic acid used in the compositions of the present invention may be varied from about 0.5% to about 1.5% by weight based on the total weight of melamine compound used. It is preferred to use about 1% by weight based on the total weight of melamine compound used. It should be noted that the melamine compound used in the present invention, namely, the hexamethyl ether of hexamethylol melamine is not a resinous material. This melamine compound is probably considered to be monomeric although probably potentially a thermosetting resin forming material.

The epoxy resinous materials that may be blended with aldehyde condensates of usea and melamine are disclosed in U.S. Patent 2,528,360 which discloses a plurality of epoxy resinous materials in admixture with urea-formaldehyde resins, melamine-formaldehyde resins and the like. Compositions such as these, however, generally require for film forming a baking temperature around 375° C. in order to convert the resinous material to a hard film, but in the course of baking there is sometimes imparted a deleterious effect, namely a yellowing of the film. The disadvantage of this effect can readily be seen when using colored coatings such as white or pastel colors. Coating compositions which yellow during baking are undesirable. We have found that by using the hexamethyl ether of hexamethylol melamine that one can bake at elevated temperatures without any noticeable yellowing of the film even with whites or pastels. Not only do the compositions of the present invention afford this outstanding advantage over the compositions of the prior art but the compositions of the present invention can be baked at temperatures substantially below 375° F. such as at 350° F., 325° F. and 320° F. to produce mar-resistant films with good color, gloss and other desirable properties.

The hexamethyl ether of hexamethylol melamine can be added to the epoxy resin directly in the stated amounts or a solution of the hexamethyl ether of hexamethylol melamine in an inert organic solvent may be blended with a comparatively small amount of the epoxy resinous material, which solution would be classed as an epoxy resin hardener. Thereupon, the hardener is added, when and as desired, to the larger amount of epoxy resin so as to provide a composition having the respective proportions of materials within the ranges outlined hereinabove.

In preparing the hardener one may use as much as 90 parts of the hexamethyl ether of hexamethylol melamine to 10 parts of the epoxy resin or reciprocally one may use as little as 10 parts of the hexamethyl ether of the hexamethylol melamine with 90 parts of the epoxy resin material. In the latter instance, additional epoxy resin may be added, if desired, in order to produce a composition having only 7% by weight of the hexamethyl ether of hexamethylol melamine and correspondingly 93% of the epoxy resin. Obviously, intermediate blends of these materials may be prepared.

EXAMPLE I

Into a suitable mixing vessel there is introduced 67 parts of hexamethyl ether of hexamethylol melamine, 33 parts of an epoxy resin prepared by reacting bis-phenol A and epichlorohydrin identified and available commercially as Epon Resin 1007 and sufficient solvent to provide a 55% solids solution. The solvent is composed of equal parts of the following materials: methylisobutylketone, butanol, toluene and xylene. The materials are thoroughly stirred to provide a uniformly dispersed resinous solution. If necessary, slight warming will effect dispersion and solution more readily. This solution is then divided into six equal parts. Each part of this solution is then blended with a sufficient amount of the same epoxy resin to provide the following percentages of hexamethyl ether of hexamethylol melamine in the total vehicle solids composition, namely, 7½%, 10%, 12½, 15%, 20% and 25%. To these six samples there is then added a sufficient amount of titanium dioxide pigment so as to provide a pigment/binder ratio of 1:1. Upon complete and uniform dispersion of the pigment in the resinous solution there is then added 1% of para-toluene sulfonic acid, based on the weight of the hexamethyl ether of hexamethylol melamine, to each of the samples. Films are drawn down from each of the samples on tin plated steel panels and are baked for 30 minutes at 375° F. in each instance. The results are shown in Table I.

Table I

|  | 1 | 2 | 3 | 4 | 5 | 6 |
|---|---|---|---|---|---|---|
| MF₆Me₆, percent | 7½ | 10 | 12½ | 15 | 20 | 25 |
| Baked at 375° F.: |  |  |  |  |  |  |
| 60° Gloss | 100 | 99 | 100 | 100 | 94 | 99 |
| Sward Hardness | 60 | 62 | 70 | 72 | 58 | 58 |
| Impact, back | 28 | 28 | 26 | 20 | 2 | 1 |
| NaOH, hours | 565 | 565 | 850– | 860 | 360 | 360 |
| HAc, hours | 930 | 840 | 840 | 1,300– | 665 | 500 |
| Alcohol, hours | 225 | 630 | 1,110 | 1,230– | 930 | 860 |
| NaOH, boil, hours | 0 | 0 | 8 | 8 | 10 | 10 |
| Xylol, hours | 200 | 2,350 | 2,450 | 2,690+ | 1,650 | 1,030 |

Additional films are drawn down from each of the samples on steel plates and these films are baked for 30 minutes at 320° F. in each instance. The results are shown in Table II.

Table II

|  | 1 | 2 | 3 | 4 | 5 | 6 |
|---|---|---|---|---|---|---|
| MF₆Me₆, percent | 7½ | 10 | 12½ | 15 | 20 | 25 |
| Baked at 320° F.: |  |  |  |  |  |  |
| 60° Gloss | 98 | 100+ | 100+ | 100+ | 100 | 95 |
| Sward Hardness | 56 | 56 | 80 | 70 | 66 | 60 |
| Impact, back | 2 | 2 | 4 | 18 | 26 | 28 |
| NaOH, hours | 300 | 325 | 300 | 300 | 500 | 360 |
| HAc, hours | 170 | 191 | 191 | 310 | 360 | 500 |
| Alcohol, hours | 2 | 20 | 52 | 99 | 840 | 890 |
| Xylol, hours | 3 | 22 | 78 | 183 | 550 | 1,670 |

I claim:

1. A composition of matter comprising a solution, in an inert organic solvent, of a blend of (1) from about 72% to about 93% by weight of an epoxy resin prepared by reacting epichlorohydrin and a polyhydric phenol and (2) correspondingly from about 28% to about 7% by weight of hexamethyl ether of hexamethylol melamine and a curing catalyst for said blend comprising from about 0.5% to about 1.5% by weight based on the solids weight of (2) of para-toluene sulfonic acid.

2. A composition of matter comprising a solution, in an inert organic solvent, of a blend of (1) from about 75% to about 87.5% by weight of an epoxy resin prepared by reacting epichlorohydrin and a polyhydric phenol and (2) correspondingly from about 25% to about 12.5% by weight of hexamethyl ether of hexamethylol melamine and a curing catalyst for said blend comprising from about 0.5% to about 1.5% by weight based on the solids weight of (2) of para-toluene sulfonic acid.

3. A composition of matter comprising a solution, in an inert organic solvent, of a blend of (1) from about 72% to about 93% by weight of an epoxy resin prepared by reacting epichlorohydrin and a 4,4'-dihydroxydiphenyldimethyl methane and (2) correspondingly from about 28% to about 7% by weight of hexamethyl ether of hexamethylol melamine and a curing catalyst for said blend comprising from about 0.5% to about 1.5% by weight based on the solids weight of (2) of para-toluene sulfonic acid.

4. A composition of matter comprising a solution, in an inert organic solvent, of a blend of (1) from about 75% to about 87.5% by weight of an epoxy resin prepared by reacting epichlorohydrin and a 4,4'-dihydroxydiphenyldimethyl methane and (2) correspondingly from about 25% to about 12.5% by weight of hexamethyl ether of hexamethylol melamine and a curing catalyst for said blend comprising from about 0.5% to about 1.5% by weight based on the solids weight of (2) of paratoluene sulfonic acid.

References Cited in the file of this patent

UNITED STATES PATENTS

| | | |
|---|---|---|
| 2,676,162 | Marotta | Apr. 20, 1954 |
| 2,700,030 | Widmer et al. | Jan. 18, 1955 |
| 2,918,452 | Kun et al. | Dec. 22, 1959 |
| 2,935,488 | Phillips et al. | May 3, 1960 |

OTHER REFERENCES

British Plastics, February 1943, Gams, Widmer, and Fisch, pages 508–520.

UNITED STATES PATENT OFFICE
CERTIFICATE OF CORRECTION

Patent No. 3,114,727                      December 17, 1963

William L. Hensley

It is hereby certified that error appears in the above numbered patent requiring correction and that the said Letters Patent should read as corrected below.

Column 3, line 43, for "usea" read -- urea --; column 4, line 29, for "12½" read -- 12½% --.

Signed and sealed this 28th day of April 1964.

(SEAL)
Attest:

ERNEST W. SWIDER                      EDWARD J. BRENNER
Attesting Officer                        Commissioner of Patents